United States Patent [19]

Kumer et al.

[11] Patent Number: 4,624,159
[45] Date of Patent: Nov. 25, 1986

[54] LATHE ACCESSORY

[75] Inventors: Francis H. Kumer; Hans J. Leiber, both of Tramelan, Switzerland

[73] Assignee: Kummer Freres SA, Fabriques de Machines, Tramelan, Switzerland

[21] Appl. No.: 636,360

[22] Filed: Jul. 31, 1984

[30] Foreign Application Priority Data

Aug. 8, 1983 [CH] Switzerland .................... 4306/83

[51] Int. Cl.⁴ ........................... B23B 3/26; B23B 3/28
[52] U.S. Cl. .......................................... 82/19; 82/2 E; 82/1.4
[58] Field of Search ................ 82/19, 2 E, 2 R, 1.2, 82/1.4, 11, 5

[56] References Cited

U.S. PATENT DOCUMENTS

| 3,688,500 | 9/1972 | Chancel . |
| 3,813,969 | 6/1974 | Wheeler . |
| 3,816,996 | 6/1974 | Uhtenwoldt . |
| 3,888,146 | 6/1975 | Tomenceak . |
| 4,004,377 | 1/1977 | Laudick . |
| 4,215,603 | 8/1980 | Jones ..................................... 82/1.4 |

FOREIGN PATENT DOCUMENTS

| 0065993 | 6/1982 | European Pat. Off. . |
| 2728384 | 1/1979 | Fed. Rep. of Germany . |
| 5822601 | 10/1983 | Japan . |
| 58-4342 | 11/1983 | Japan . |
| 509064 | 7/1939 | United Kingdom ..................... 82/19 |
| 757256 | 8/1980 | U.S.S.R. .................................. 82/19 |

Primary Examiner—Leonidas Vlachos
Attorney, Agent, or Firm—Parkhurst & Oliff

[57] ABSTRACT

The pedestal of the accessory apparatus, to be secured to the cross-slide of an automatic lathe, has a sliding guide arrangement for a bearing box in which a rotor is hydrostatically mounted for rotational and longitudinal movement. The rotor is held by a spring with its hydrostatically supported feeler-roll against a control curve which is accommodated encased in the bearing box. The rotor is connected by a sliding key connection to a key shaft seated fast on the shaft of an electric motor secured to the bearing box. The rotor is equipped at its front end with a slide plate guided for radial displacement, to which two diametrically opposite tools are secured. With one of these tools, an outside cylindrical surface adjoining a shoulder is machined on a non-rotating workpeice, whereupon the workpeice is rotated through 180° so that the shoulder can be machined with the aid of the other tool, the slide plate being radially displaced on the rotor until it reaches a stop position.

8 Claims, 5 Drawing Figures

LATHE ACCESSORY

This invention relates to auxiliary equipment for automatic lathes, and more particularly to accessory apparatus intended to be attached to the cross-slide of a lathe having a work spindle lockable against rotation and an associated chuck for high-precision machining of the outer cylindrical surface and an adjoining shoulder, having a specific pitch, of a workpiece.

Figure 1:
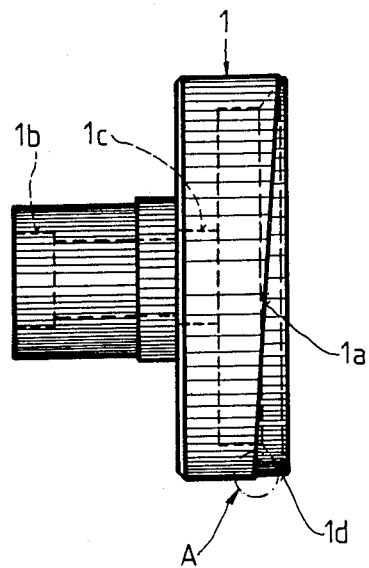
Figure 1A:
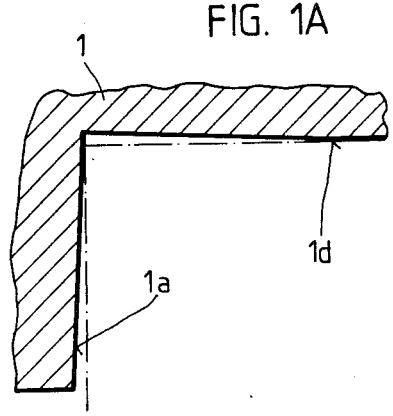

Such workpieces are, for example, capstans for video recorders. A simplified elevation of a capstan of this kind is shown in FIG. 1 of the accompanying drawings, designated by reference numeral 1; FIG. 1A is a partial radial section taken in the region marked A of FIG. 1, on a greatly enlarged scale.

For many years now, the present assignee has been manufacturing a lathe accessory by means of which workpieces of the aforementioned kind are machined. The essential characteristics of this accessory apparatus are that the longitudinal movements of its tool carrier necessary for machining the mentioned shoulder (1a, FIGS. 1 and 1A) are controlled by a non-encased bell-shaped curve built up concentrically on the work spindle. This apparatus has worked satisfactorily for the past requirements of accuracy as regards dimensions and shape of the workpieces to be produced.

In the future, however, the mentioned workpieces, especially capstans for video recorders, will have to meet much stricter requirements for accuracy of dimensions and shape, as well as for surface quality. The tolerances in diameter, in the concentricity of bore sections 1b and 1c and of cylindrical outer surface 1d adjoining shoulder 1a, and also in the pitch of shoulder 1a, are on the order of only a few thousandths of a millimeter. With these new and extreme quality requirements, however, the performance limits of the current accessory apparatus are exceeded.

For example, one circumstance having an unfavorable influence on the surface quality of the workpieces to be produced is that the forces necessary for the oscillating movements of the tool carrier must be absorbed by the bearing of the work spindle. Furthermore, the bell-shaped curve and the feeler-roll operatively connected thereto are situated directly in the work space, entailing problems of maintaining cleanliness, of optimum lubrication, and of wear and tear. Even the slightest amount of wear on these two parts requires that they be re-machined, for otherwise the permissible tolerances in the shape of shoulder 1a will be exceeded.

It is this situation that the present invention intends to remedy. Its point of departure is prior art apparatus of the type having a rotor rotating mounted in a housing, this rotor being operatively connected to rotational drive means and provided with means for bearing at least one tool disposed on the exposed end face thereof, further having a feeler-roll held by pressing means against a fixed annular control curve surface disposed behind the rotor in a closed space of the housing and determining the pitch of the shoulder.

Apparatus of this type is described in West German Disclosed Application (DOS) No. 27 38384. This accessory apparatus is used in the material-detaching machining of connection pieces on large containers, e.g., pressure tanks, reactors, vacuum chambers, etc. The accuracy needed in such machining is naturally tens of times less than that required of the subject of the present invention. There are many reasons why the previous apparatus could not meet these requirements. For one thing, there are only two thrust ball-bearings provided, one at each end of the rotor, for rotational mounting of the latter. The torque exerted from the workpiece upon the tool or tools will thus cause the rotor to be positioned slightly askew. Another source of error in this prior art apparatus is that the tools are not mounted axially immovably on the rotor itself by rather on a disk-shaped support to which guide rams, sliding in ball-bearing guide bushes within eccentric longitudinal bores in the rotor, are secured. One of these guide rams is equipped with the feeler roll which is held against the control curve surface. The other guide ram is similarly equipped with a feeler-roll which is held against an auxiliary control surface and controls axial movements of a ring; braced against the latter are springs which hold the first-mentioned feeler-roll against the profile-determining control curve surface. This peculiarity of the design is not only a source of potential error but is also structurally cumbersome and expensive; it requires a great deal of space and a great deal of maintenance.

It is an object of this invention to provide an improved lathe accessory of the aforementioned type which eliminates the shortcomings of the prior art apparatus.

To this end, in the apparatus according to the present invention, the housing takes the form of a bearing box and is provided on its rearward end face with a closure cover fastened to it and bounding the mentioned closed space toward the rear, there being a pedestal for mounting the bearing box on the cross-slide, so that the axis of a bearing bore in the bearing box coincides with the axis of the work spindle, and further the rotor is also mounted for longitudinal movement in the bearing bore, both the feeler-roll and the tool or tools being mounted axially immovably on the rotor.

Figure 2:
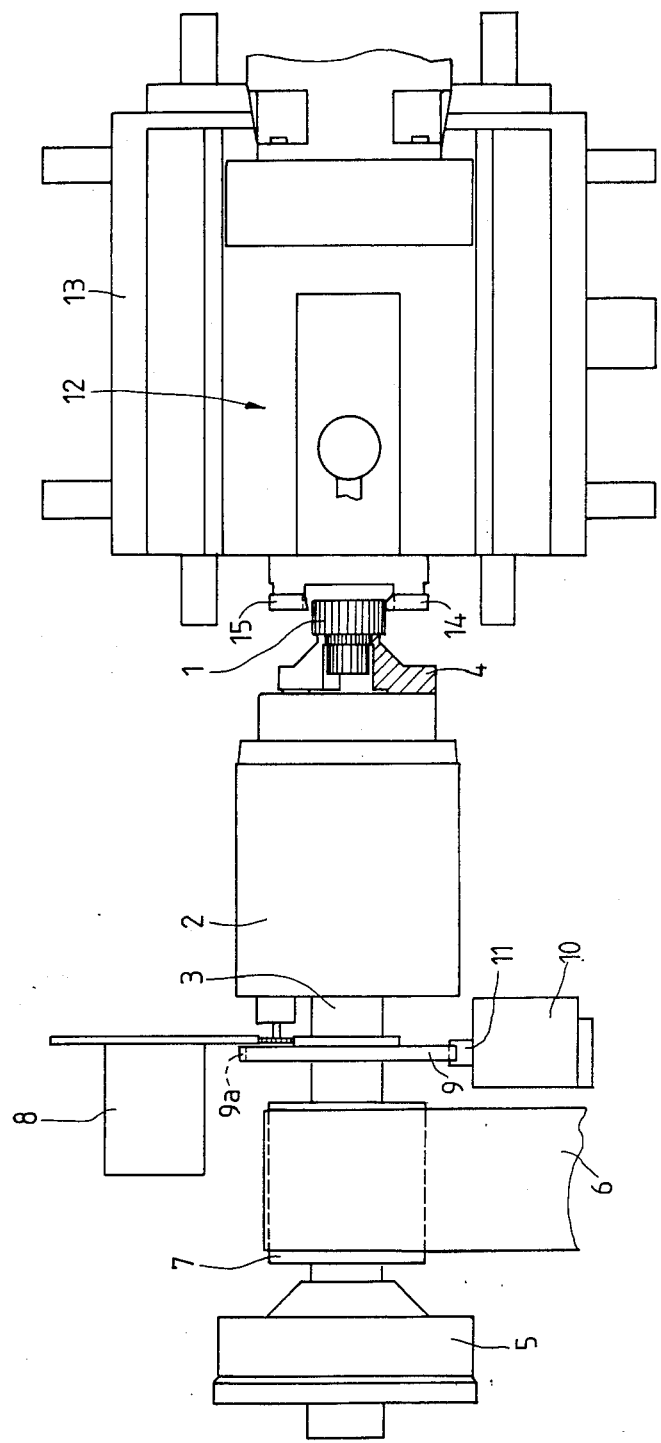
Figure 3:
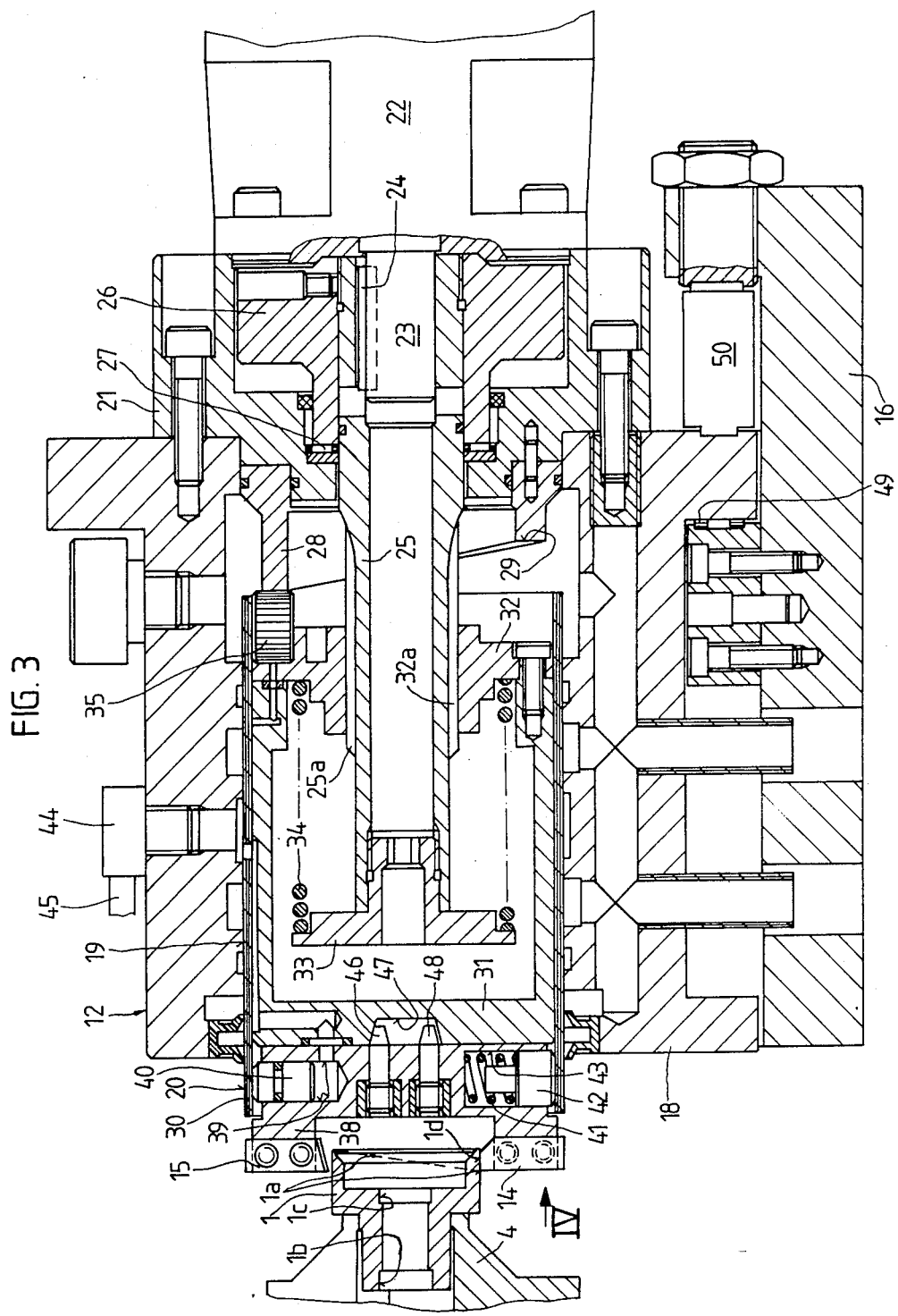
Figure 4:
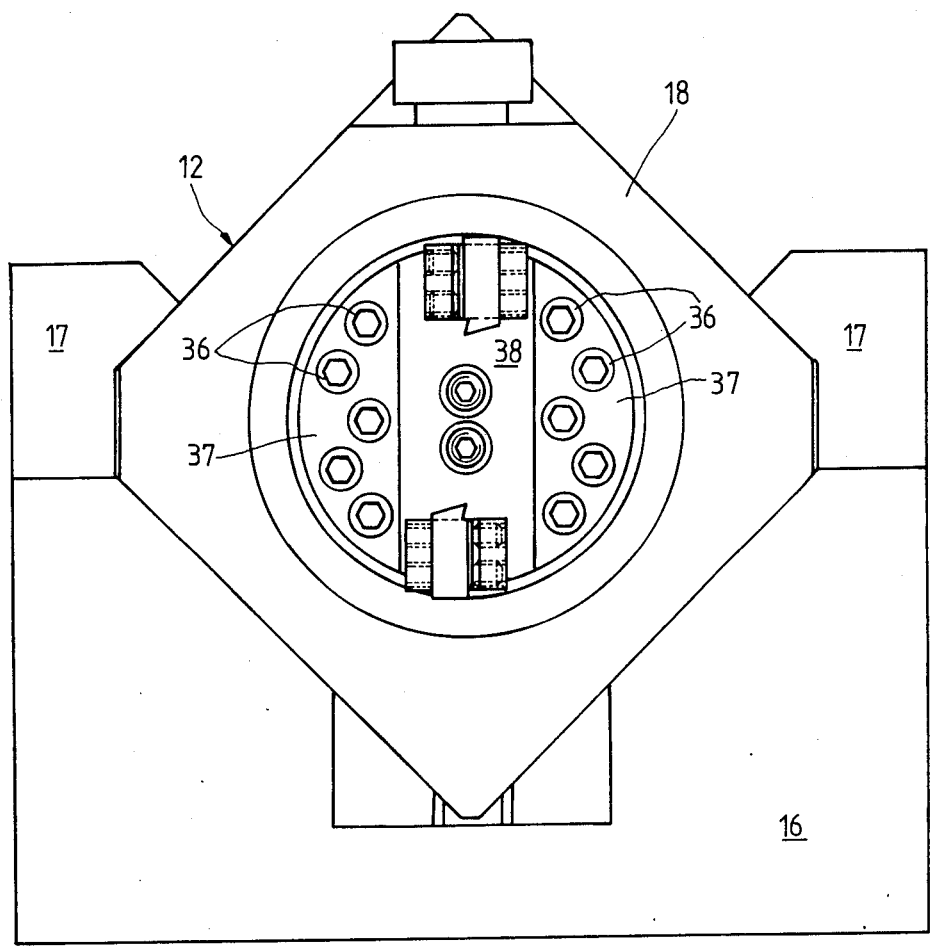

Other objects and advantages of the invention will become apparent from the following detailed description of a preferred embodiment thereof, taken in conjunction with FIGS. 2 to 4 of the accompanying drawings, in which:

FIG. 2 is a diagrammatic top plan view of an automatic lathe equipped with an embodiment of the invention, FIG. 3 is a longitudinal section through this accessory apparatus, and FIG. 4 is an end-on view facing in the direction indicated by arrow IV in FIG. 3.

The automatic lathe of FIG. 2 has a headstock 2 in which there is disposed a work spindle 3 having a chuck 4 which can be engaged and disengaged by means of a hydraulic chucking cylinder 5. Spindle 3 is rotatingly driven by an electric motor (not shown) which can be selectively caused to run either very slowly or at adjustable high speeds of rotation; this motor is drivingly connected to spindle 3 by a belt drive comprising a belt 6 and a pulley 7 mounted on this spindle. Drivenly connected to spindle 3 is the rotor of a revolution counter 8 which acts as a tachometer for the motor control. Also fixed on spindle 3 is a disk 9 having two exactly diametrically opposed V-shaped notches 9a; a stationary locking device 10 has an operative part 11 which, when spindle 3 is running very slowly, can be caused to engage one or the other of the notches 9a in order to lock spindle 3 in one or the other of two positions of rotation exactly 180° apart, for purposes to be explained below in connection with the description of the mode of operation of the accessory apparatus.

The lathe accessory apparatus which forms the subject of this invention is designated as a whole by reference numeral 12 and is mounted on a cross-slide 13 of the automatic lathe, so that it can be engaged and disengaged by moving this cross-slide and can also be utilized in a first phase of use of the accessory apparatus, namely, for the axial thrust of a tool 14 operating during machining of cylindrical outer surface 1d on workpiece 1, with spindle 3 held stationary in one of the two positions of rotation selectable by means of locking device 10. Before the change over to machining of shoulder 1a on workpiece 1 with a tool 15 situated diametrically opposite tool 14, spindle 3 is rotated through half a revolution by means of the aforementioned motor and then relocked by means of locking device 10 to prevent rotation. The respective functions of the motor and of locking device 10 are controlled along with such functions on accessory apparatus 12 by control apparatus (not shown). Since the control of the most varied operations on automatic lathes by means of such control equipment is well known, there is no need to go into it in more detail here.

Turning now to FIG. 3, wee see that accessory 12 has, fixed to cross-slide 13, a pedestal 16 which, together with gibs 17 (see FIG. 4), forms a slide bar for a bearing box 18 having a bearing bore 19 for a rotor, designated as a whole by reference numeral 20, which is preferably mounted hydrostatically in the bearing bore 19. The latter is closed at the rear by a screwed-on cover 21, to the outside of which the stator of an electric motor 22 is in turn screwed on. Fixed to the shaft 23 of motor 22 for rotation therewith is the key 24 of a key shaft 25, the rear part of which is secured to a ring 26 braced against cover 21 by means of a shoulder bearing 27. In an annular space formed between bearing box 18 and cover 21 there is seated fast a ring 28 having on its front face a curve surface 29, the profile of which is an exact reproduction of the profile of shoulder 1a to be produced on workpiece 1.

Rotor 20 has a tubular jacket 30 which may, for example, be made of hardened steel; it also has a cup-shaped rotor body 31, to the rearward end portion of which a ring 32 is screwed on, a rim of concentric key projections 32a being formed on the inner circumference of ring 32. These projections engage key projections 25a of key shaft 25 in such a way that shaft 25 and rotor 20 are slidingly connected for rotation together. Screwed fast into the forward end portion of key shaft 25 is a spring-support part 33 against which a compression spring 34 is braced, the rearward end of which acts upon rotor ring 32. The latter has a semicylindrical pocket in which a hydrostatically balanced roller 35 is supported, by means of which rotor 20 is held against control curve surface 29 of ring 28 by spring 34.

A slide plate 38 is radially guided against the bottom of cup-shaped rotor body 31 by means of two segment-shaped gibs 37 secured by screws 36 to the bottom of that body (see FIG. 4). Slide plate 38 has two approximately diametrically opposed fingers to which tools 14 and 15 (chisels) are screwed. Displacement of slide plate 38 is effected hydraulically through the earlier-mentioned control apparatus by means of a piston 40 acting within a bore 39 of slide plate 38 and braced on rotor jacket 30 against the bias of a spring 41 which, together with a spring plunger 42, acts in an opposite bore 43 of slide plate 38 and is braced against rotor jacket 30 by means of plunger 42. Bore 39 communicates with the above-mentioned control apparatus via ducts formed in parts 38, 31, and 18 and visible in FIG. 3, a connecting part 44 screwed onto bearing box 18, and a pressure slide 45.

After bore sections 1b and 1c in particular have been machined on workpiece 1 clamped in chuck 4, and work spindle 3 has then been secured against rotation by means of locking device 10, the accessory apparatus described above operates as follows: electric motor 22 is turned on, and cylindrical outer surface 1d is machined with the aid of tool 14, the entire accessory apparatus being advanced axially using cross-slide 13. At this time slide plate 38 assumes the position shown in FIG. 3 because, as a prerequisite, such a low pressure prevails in bore 39 that spring 41 presses a stop screw 46 against an associated stop shoulder at one end of a recess 47 in the bottom of rotor body 31, whereby the exact diameter of the cylindrical outer surface produced on workpiece 1 is determined. At this time, fabrication of shoulder 1a is also already started because rotor 20, during its rotation, follows the profile of curve surface 29 under the influence of spring 34 and is thus axially reciprocated during each rotation. As soon as the machining of outer surface 1d has been completed, the tool 15 must be put into operation for finishing shoulder 1a and the adjoining area of surface 1d (cf. FIG. 1A); this is done by raising the pressure of the liquid in bore 39 until the bias of spring 41 is overcome and a stop screw 48 rests against the associated end of recess 47. Along with this radial displacement of slide plate 38, work spindle 3 together with chuck 4 and workpiece 1 must be rotated through half a revolution as a result of the changeover from the use of tool 14 to that of the diametrically opposed tool 15; for this purpose, controlled by the above-mentioned control apparatus, locking device 10 is temporarily disengaged, and the motor driving work spindle 3 is temporarily set in motion until spindle 3 has completed the half revolution. Locking device 10 is thereupon reactivated in order to block spindle 3 once more. Shoulder 1a and the adjoining portion of surface 1d (FIG. 1A) are finished in a simple recessing operation by displacing slide plate 38 on rotor body 31 until stop screw 48 becomes operative. As soon as this finishing operation is completed, tool 15 is lifted off workpiece 1 by reducing the oil pressure in bore 39, whereupon the accessory apparatus is moved out of the vicinity of workpiece 1 by appropriate movements of cross-slide 13 so that the completely machined workpiece can thereafter be released from chuck 4 and a new workpiece can be chucked.

In the embodiment of the accessory apparatus described above, only the cutting forces act upon workpiece 1 and work spindle 3; control curve 29 and the cooperating feeler roll 35 operate in a clean space and can be effectively lubricated. This arrangement, in conjunction with the hydrostatic mounting of rotor 20, guarantees highest precision and surface quality on the finished workpieces. The accessory apparatus according to the present invention is also distinguished by a further particularity, however: if control curve 29 is not made absolutely exact, if some sections of the curve are not uniformly worn, or because of other influences, faults may occur in the contour of shoulder 1a of workpiece 1; in order to compensate for such faults, bearing box 18 is guided for longitudinal movement on pedestal 16, as already mentioned. This longitudinal movement is brought about, for example, by a piezoelectric drive 50 acting against a set of cup springs 49. For controlling these longitudinal movements, amounting to only the tiniest fractions of millimeters, a pulse generator is affixed to the rearward end of the shaft of drive motor 22. By means of this pulse generator, the necessary correction values can be assigned to any desired curve sections, determined by means of programming, via an appropriate control. These correction values are then converted by piezoelectric drive 50 (or some other suitable position corrector) into the corresponding longitudinal movements of pedestal 16 together with rotor 20. In this way, it is possible to produce the contour of shoulder 1a of workpiece 1 with hitherto unattainable accuracy.

What is claimed is:

1. Accessory apparatus for a lathe having a work spindle lockable against rotation and an associated chuck for high-precision machining of the outer cylindrical surface and an adjoining shoulder of a work piece, said accessory apparatus comprising:

driving means;

a pedestal mounted on a cross slide;

means for axially moving said cross slide toward and away from said work piece;

a housing slidably disposed in said pedestal, said housing having a bearing bore disposed therein;

means for sliding said housing in said pedestal;

a rotor and rotor jacket mounted for longitudinal displacement within said bearing bore of said housing, said rotor having a first end operatively connected to said driving means and an exposed end face at the other end thereof remote from said driving means;

slide plate means attached to said exposed end face of the rotor for holding two diametrically opposed tools capable of machining said work piece in two independent operations, said tools being radially shiftable, but axially immovable on said rotor;

means for radially shifting said tools on said rotor;

a fixed annular radical cam supported on said housing and disposed adjacent to said first end of said rotor for determining a pitch of said shoulder; and a feeler roller mounted axially immovably on a portion of the rotor and disposed between said portion of the rotor and the radial cam, said feeler roller being held against the radial cam by a pressure spring juxtaposed between said portion of the rotor and a portion of said driving means, whereby upon rotation of the rotor the feeler roller follows the radial cam thereby longitudinally displacing the rotor to machine said outer cylindrical surface and adjoining shoulder of said work piece.

2. The apparatus of claim 1, wherein said slide plate means includes two end portions respectively adapted for holding said two tools, and further wherein said radial tool shifting means comprises means for hydraulically moving said slide plate means selectively into either of two oppositely situated operating positions, whereby one or the other of said tools becomes operative, said slide plate means further comprising stop means for holding said slide plate means in one or the other of said two operating positions.

3. The apparatus of claim 2, wherein said slide plate means further includes two respective bores, a first of said two bores containing a servo-piston supported against said rotor jacket, said first bore being further connected to hydraulic control means by a duct passing from said first bore through said slide plate means, and a second of said two bores containing a spring supported against said rotor jacket, whereby said slide plate is displaceable against the bias of said spring from the one to the other of said two operating positions according to the pressure of fluid supplied to said first of said two bores from said hydraulic control means.

4. The apparatus of claim 1, wherein said driving means comprises:

an electric motor having a motor shaft;

a key shaft connected to said motor shaft and passing through said annular cam into engagement with said portion of the rotor upon which is mounted the feeler roller, whereby the key shaft transmits rotational motion from said motor shaft to said rotor, and further whereby the rotor is longitudinally freely displaceable on said key shaft; and a spring-support part connected to the end of said key shaft remote from said motor, said pressure spring acting at one end thereof against said spring-support part and acting at the other end thereof against said portion of the rotor upon which is mounted the feeler roller.

5. The apparatus of claim 1, wherein said housing is axially movably guided in said pedestal and said apparatus further comprises a programmable control circuit, and further wherein said housing sliding means comprises position correction means connected to said control circuit and held against said housing by a spring plate, whereby the position of said housing can be corrected by said position correction means.

6. The apparatus of claim 5, wherein said position correction means is a piezoelectric driving means.

7. The apparatus of claim 1, wherein said rotor is hydrostatically mounted in said bearing bore of said housing.

8. The apparatus of claim 1, wherein said rotor jacket includes a semicylindrical bearing pocket on its inner surface, said feeler roller being hydrostatically mounted in said bearing pocket.

* * * * *